US012663960B2

(12) United States Patent
Zeng

(10) Patent No.: US 12,663,960 B2
(45) Date of Patent: Jun. 23, 2026

(54) DATA TRANSMISSION METHOD AND DEVICE, AND STORAGE MEDIUM AND TERMINAL DEVICE

(71) Applicant: SHENZHEN TCL NEW TECHNOLOGY CO., LTD., Shenzhen (CN)

(72) Inventor: Qingzhong Zeng, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 305 days.

(21) Appl. No.: 18/704,989

(22) PCT Filed: Oct. 13, 2022

(86) PCT No.: PCT/CN2022/125049
§ 371 (c)(1),
(2) Date: Apr. 26, 2024

(87) PCT Pub. No.: WO2023/071813
PCT Pub. Date: May 4, 2023

(65) Prior Publication Data
US 2025/0272051 A1 Aug. 28, 2025

(30) Foreign Application Priority Data
Oct. 26, 2021 (CN) .......................... 202111250002.2

(51) Int. Cl.
*G06F 3/16* (2006.01)
*H04R 1/10* (2026.01)

(52) U.S. Cl.
CPC ........... *G06F 3/165* (2013.01); *H04R 1/1083* (2013.01); *H04R 2420/07* (2013.01)

(58) Field of Classification Search
CPC .................. G06F 3/165; H04R 1/1083; H04R 2420/07; H04L 65/80; Y02D 30/70
See application file for complete search history.

(56) References Cited

U.S. PATENT DOCUMENTS 8,989,661 B2 * 3/2015 Hillyard ................ H04L 65/613
455/41.3
12,225,339 B2 * 2/2025 Yin ........................... H04R 5/04
(Continued)

FOREIGN PATENT DOCUMENTS

CN 104993849 A 10/2015
CN 105989844 A 10/2016
(Continued)

OTHER PUBLICATIONS

International Search Report in International application No. PCT/CN2022/125049, mailed on Jan. 11, 2023.
(Continued)

*Primary Examiner* — Phung-Hoang J Nguyen
(74) *Attorney, Agent, or Firm* — PV IP PC; Wei Te Chung

(57) ABSTRACT

A data transmission method and device, and a storage medium and a terminal device, which are applied to the technical field of information processing. The method comprises: a sending end device monitoring an audio data transmission parameter, and when the parameter value of the audio data transmission parameter meets a preset condition, adjusting the current first audio data processing policy having a better sound-effect processing effect to be a second audio data processing policy having a slightly poorer sound-effect processing effect but a better data processing efficiency, and pre-processing audio data to be processed according to the second audio data processing policy, so as to obtain, as soon as possible, pre-processed audio data for transmission to a receiving end device. Therefore, the trans-
(Continued)

mission efficiency of audio data transmission is improved, the delay of the audio data during the transmission process is reduced, and the method is universal and expandable.

19 Claims, 9 Drawing Sheets

(56) References Cited

U.S. PATENT DOCUMENTS

| | | | |
|---|---|---|---|
| 12,446,084 B2 * | 10/2025 | Yu | H04W 4/80 |
| 2007/0049196 A1 | 3/2007 | Hillyard et al. | |
| 2013/0243390 A1 * | 9/2013 | Yoshio | H04N 21/41422 |
| | | | 386/230 |
| 2018/0011683 A1 | 1/2018 | Zhao et al. | |
| 2019/0104423 A1 | 4/2019 | Hariharan et al. | |
| 2020/0107107 A1 | 4/2020 | Gong | |

FOREIGN PATENT DOCUMENTS

| | | |
|---|---|---|
| CN | 108133712 A | 6/2018 |
| CN | 109003618 A | 12/2018 |
| CN | 109005582 A | 12/2018 |
| CN | 109151783 A | 1/2019 |
| CN | 109274813 A | 1/2019 |
| CN | 112969115 A | 6/2021 |
| CN | 114006890 A | 2/2022 |

OTHER PUBLICATIONS

Written Opinion of the International Search Authority in International application No. PCT/CN2022/125049, mailed on Jan. 11, 2023.

Chinese Office Action issued in corresponding Chinese Patent Application No. 202111250002.2 dated Jun. 29, 2023, pp. 1-9.

* cited by examiner

100

200

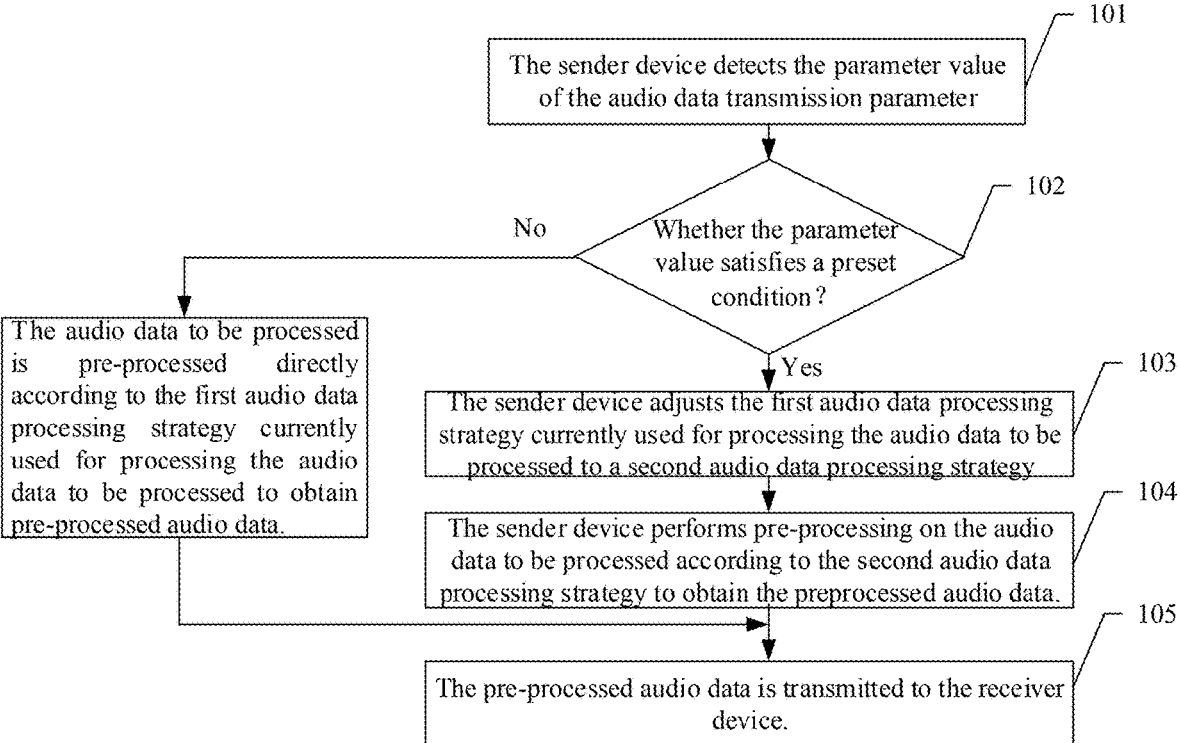

The sender device detects the parameter value of the audio data transmission parameter — 101

Whether the parameter value satisfies a preset condition? — 102

No

The audio data to be processed is pre-processed directly according to the first audio data processing strategy currently used for processing the audio data to be processed to obtain pre-processed audio data.

Yes

The sender device adjusts the first audio data processing strategy currently used for processing the audio data to be processed to a second audio data processing strategy — 103

The sender device performs pre-processing on the audio data to be processed according to the second audio data processing strategy to obtain the preprocessed audio data. — 104

The pre-processed audio data is transmitted to the receiver device. — 105

Fig. 3

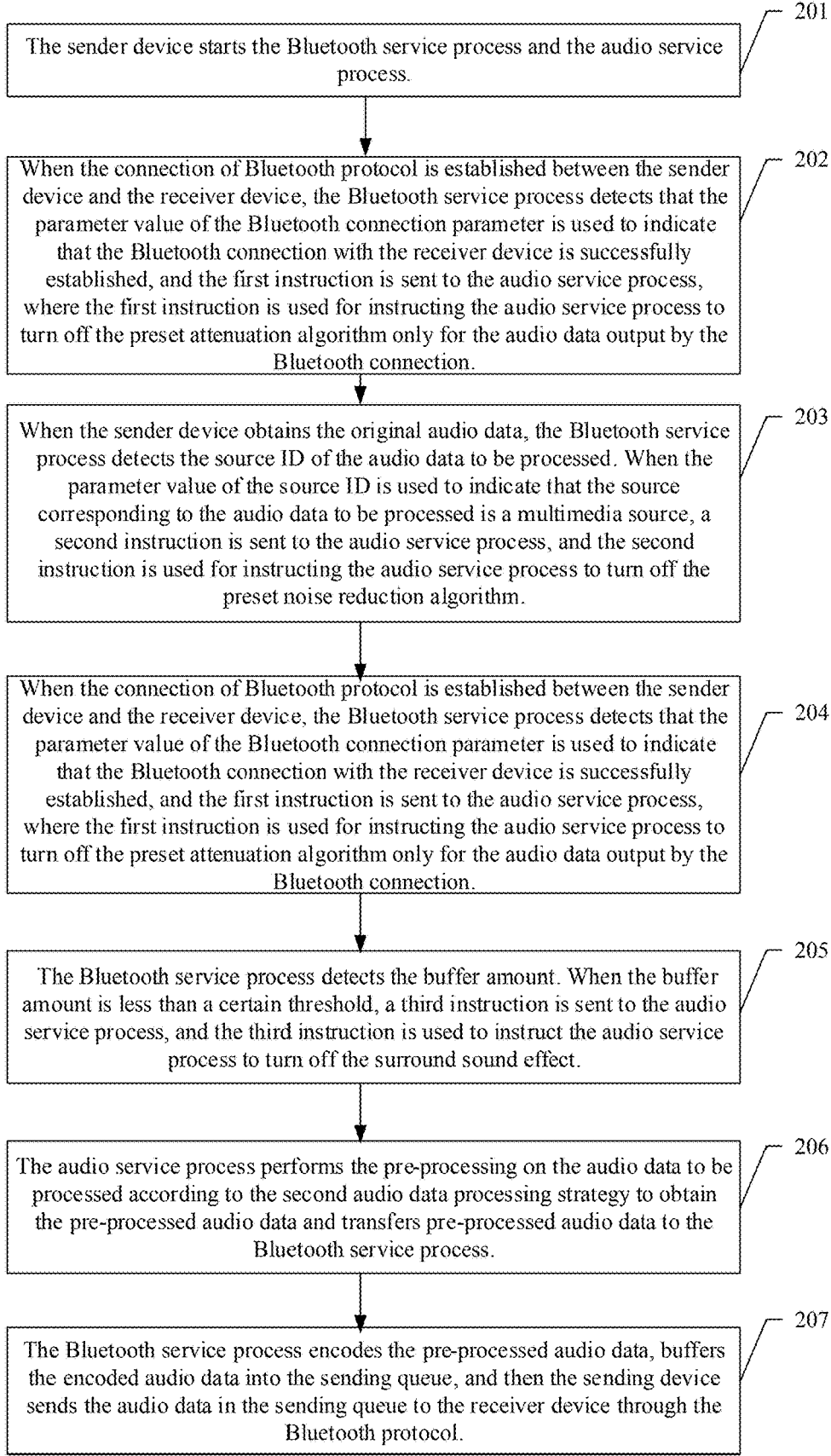

201

The sender device starts the Bluetooth service process and the audio service process.

202

When the connection of Bluetooth protocol is established between the sender device and the receiver device, the Bluetooth service process detects that the parameter value of the Bluetooth connection parameter is used to indicate that the Bluetooth connection with the receiver device is successfully established, and the first instruction is sent to the audio service process, where the first instruction is used for instructing the audio service process to turn off the preset attenuation algorithm only for the audio data output by the Bluetooth connection.

203

When the sender device obtains the original audio data, the Bluetooth service process detects the source ID of the audio data to be processed. When the parameter value of the source ID is used to indicate that the source corresponding to the audio data to be processed is a multimedia source, a second instruction is sent to the audio service process, and the second instruction is used for instructing the audio service process to turn off the preset noise reduction algorithm.

204

When the connection of Bluetooth protocol is established between the sender device and the receiver device, the Bluetooth service process detects that the parameter value of the Bluetooth connection parameter is used to indicate that the Bluetooth connection with the receiver device is successfully established, and the first instruction is sent to the audio service process, where the first instruction is used for instructing the audio service process to turn off the preset attenuation algorithm only for the audio data output by the Bluetooth connection.

205

The Bluetooth service process detects the buffer amount. When the buffer amount is less than a certain threshold, a third instruction is sent to the audio service process, and the third instruction is used to instruct the audio service process to turn off the surround sound effect.

206

The audio service process performs the pre-processing on the audio data to be processed according to the second audio data processing strategy to obtain the pre-processed audio data and transfers pre-processed audio data to the Bluetooth service process.

207

The Bluetooth service process encodes the pre-processed audio data, buffers the encoded audio data into the sending queue, and then the sending device sends the audio data in the sending queue to the receiver device through the Bluetooth protocol.

Fig. 4

DATA TRANSMISSION METHOD AND DEVICE, AND STORAGE MEDIUM AND TERMINAL DEVICE

CROSS REFERENCE TO RELATED APPLICATION

This application is a US national phase application based upon an International Application No. PCT/CN2022/125049, filed on Oct. 13, 2022, which claims priority to Chinese Application No. 202111250002.2, entitled "DATA TRANSMISSION METHOD AND DEVICE, AND STORAGE MEDIUM AND TERMINAL DEVICE," filed on Oct. 26, 2021. The entire disclosures of the above applications are incorporated herein by reference.

FIELD OF THE DISCLOSURE

The present invention relates to the field of information processing technology, and in particular, to a data transmission method, a device, a storage medium and a terminal device.

BACKGROUND

With the advent of the era of the Internet of Things and the opening of the interconnection of all things, the convenience and performance of the connection between devices are higher demands. True Wireless Stereo (TWS) earphones have become more and more popular in recent years because of their easy connection with other devices. However, at the same time, there are higher demands for the efficiency of audio and video transmission through earphones. For example, there are demands for low latency for end-to-end audio and video transmission between devices, especially in specific scenarios, such as game mode scenarios.

In view of the user's higher demands for wireless headset transmission of audio and video, a solution in the industry includes: improving the performance, such as the transmission power, of the chip that transmits audio and video data in the device (the Bluetooth chip), thereby reducing the transmission buffer, so as to improve the audio and video transmission rate and achieve the effect of reducing latency. However, the power of the Bluetooth chip has a certain upper limit, and increasing the transmission power will have a large power consumption of the device. Conventionally, another method of optimizing audio and video transmission includes: presetting a private customized high-compression coding format in the devices transmitting/receiving audio and video data. This could improve the audio and video transmission rate between two devices and reduce the buffer, but using private coding to compress transmission lacks generality.

In general, the conventional audio and video transmission optimization is not universal and scalable.

SUMMARY

Technical Problem

One objective of an embodiment of the present disclosure is to provide a data transmission method, a device, a storage medium and a terminal device, to achieve an optimized audio data transmission method.

Technical Solution

According to an embodiment of the present disclosure, a data transmission method is disclosed. The method comprises:

detecting a parameter value of an audio data transmission parameter; when the parameter value of the audio data transmission parameter satisfies a preset condition;

adjusting a first audio data processing strategy currently used for processing the audio data to be processed to a second audio data processing strategy, wherein a sound effect processing effect of the first audio data processing strategy is better than a sound effect processing effect of the second audio data processing strategy, and a data processing efficiency of the second audio data processing strategy is better than a data processing efficiency of the first audio data processing strategy;

performing a pre-process on the audio data to be processed according to the second audio data processing strategy to obtain a pre-processed audio data;

transferring the pre-processed audio data to the receiver device.

According to an embodiment of the present disclosure, a data transmission device is disclosed. The data transmission device comprises:

a parameter value detection unit, configured to detect a parameter value of an audio data transmission parameter;

a processing adjustment unit, configured to adjusting a first audio data processing strategy currently used for processing the audio data to be processed to a second audio data processing strategy when the parameter value of the audio data transmission parameter satisfies a preset condition, wherein a sound effect processing effect of the first audio data processing strategy is better than a sound effect processing effect of the second audio data processing strategy, and a data processing efficiency of the second audio data processing strategy is better than a data processing efficiency of the first audio data processing strategy;

a pre-processing unit, configured to perform a pre-process on the audio data to be processed according to the second audio data processing strategy to obtain a pre-processed audio data; and a transmission unit, configured to transfer the pre-processed audio data to the receiver device.

According to another embodiment of the present disclosure, a computer-readable storage medium is provided. The computer-readable storage medium stores a plurality of computer programs, and the computer programs are suitable for being loaded by a processor and executing the data transmission method.

According to another embodiment of the present disclosure, a terminal device includes a processor and a memory. The memory is used for storing a plurality of computer programs, executed by the processor to perform the data transmission method. The processor is used for executing the plurality of computer programs.

Advantageous Effect

In an embodiment of the present disclosure, the sender device monitors the audio data transmission parameter. When the parameter value of the audio data transmission parameter meets a preset condition, the first audio data processing strategy with a better current sound effect processing effect is adjusted to the second audio data processing strategy with slightly weaker sound effect processing effect but better data processing efficiency, and the audio data to be processed are pre-processed according to the second audio data processing strategy, so that the pre-processed audio data can be obtained as soon as possible and transmitted to the receiving device. This could improve the transmission efficiency of audio data, reduce the delay of the audio data in the transmission process, and have versatility and scalability.

BRIEF DESCRIPTION OF THE DRAWINGS

In order to more clearly illustrate the embodiments of the present invention or the technical solutions in the prior art, the drawings that need to be used in the embodiments or prior art descriptions will be briefly introduced below, and it is obvious that the drawings in the following description are only some embodiments of the present invention, and for those skilled in the art, other drawings can also be obtained according to these drawings without paying creative labor.

FIG. 3 is a flow chart of a data transmission method according to an embodiment of the present disclosure.

FIG. 4 is a flow chart of a data transmission method according to another embodiment of the present disclosure.

DETAILED DESCRIPTION

The technical solutions in the embodiments of the present invention will be clearly and completely described below in conjunction with the accompanying drawings in the embodiments of the present invention, and it is obvious that the described embodiments are only part of the embodiments of the present invention, not all embodiments. Based on the embodiments in the present invention, all other embodiments obtained by a person skilled in the art without making creative labor belong to the scope of protection of the present invention.

The terms "first", "second", "third", "fourth", etc., if any, in the description and claims of the present invention and in the above-mentioned drawings are used to distinguish similar objects and are not necessarily used to describe a particular order or sequence. It should be understood that the data thus used are interchangeable in appropriate cases so that the embodiments of the invention described here could, for example, be implemented in an order other than those illustrated or described here. In addition, the terms "including" and "having" and any variations thereof are intended to cover non-exclusive inclusions, e.g., a process, method, system, product or apparatus comprising a series of steps or elements need not be limited to those steps or elements that are clearly listed, but may include other steps or elements that are not clearly listed or are inherent to those processes, methods, products or equipment.

First, the scenario of the embodiment of the present application is introduced.

Figure 1:
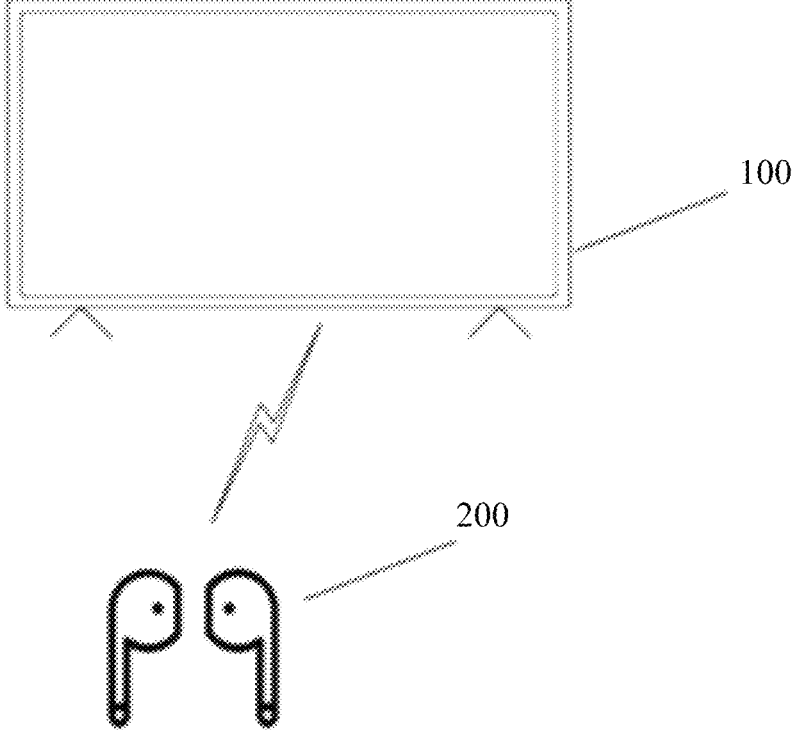
FIG. 1 is a diagram of the scenario in which the data transmission method provided in an embodiment of the present disclosure is applied.

Please refer to FIG. 1. FIG. 1 is a diagram of the scenario in which the data transmission method provided in an embodiment of the present disclosure is applied. The scenario can include a sender device 100 and a receiver device 200.

The sender device 100 may include, but is not limited to, electronic devices such as smart televisions (TVs), smart phones or tablets. The receiver device 200 may include, but is not limited to, audio playback devices, such as Bluetooth headsets or smart speakers.

The sender device 100 can maintain a wireless connection with the receiver device 200 through a wireless communication technology. This wireless communication technology can include Bluetooth (BT), for example, traditional Bluetooth or low-power BLE Bluetooth. In this embodiment, the sender device 100 can establish a Bluetooth connection with the receiver device 200 with Bluetooth function through a short-range communication protocol, such as Bluetooth, to carry out data interaction. For example, the sender device 100 and the receiver device 200 carry out a Bluetooth communication such that the sender device 100 can transmit audio data to the receiver device 200. Optionally, the wireless communication technology can also include wireless local area networks (WLAN) (such as wireless fidelity (Wi-Fi) networks), Zigbee, frequency modulation (FM), near field communication (NFC), infrared technology (infrared, IR), or general-purpose 2.4G/5G band wireless communication technology, etc.

When the sender device 100 in the preceding scenario has an audio service, if a Bluetooth connection is established between the sender device 100 and the receiver device 200, the sender device 100 can send the relevant audio data of the audio service to the receiver device 200 based on Bluetooth communication, so that the receiver device 200 plays the relevant audio data. This audio service can include playing music, recording, sounds in video files, background music in games, call tones, and so on. Here, the Bluetooth specification adopted for Bluetooth communication between the sender device 100 and the receiver device 200 comprises a specification for transmitting audio, and the specification for transmitting audio may include an advanced audio transmission profile (Advanced Audio Distribution Profile, A2DP), which allows the transmission of stereo audio signals and is commonly used in scenarios such as Bluetooth headsets and Bluetooth speakers for playing music.

Figure 2:
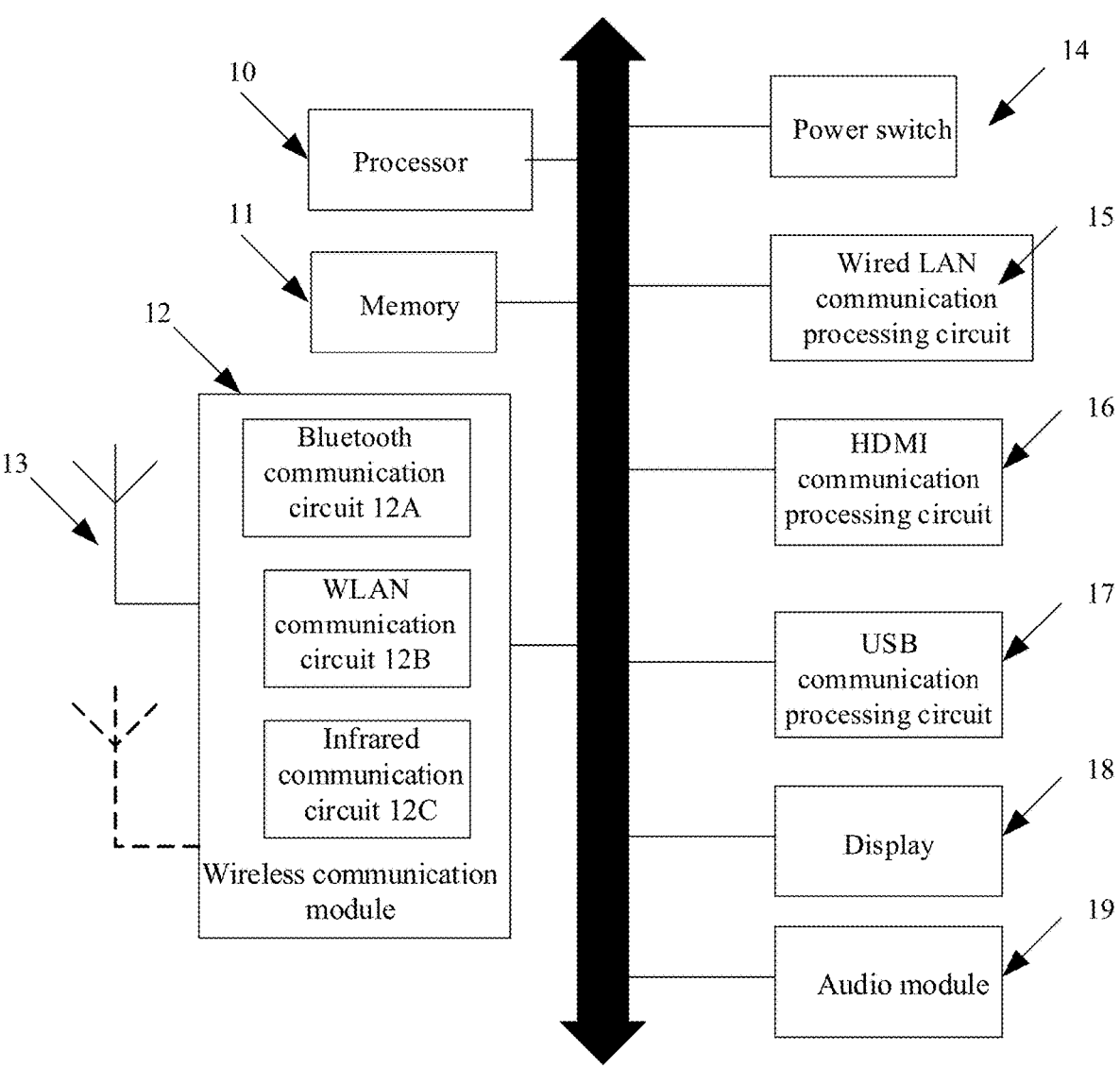
FIG. 2 is a diagram of a logical structure of a sender device according to an embodiment of the present disclosure.

FIG. 2 is a diagram of a logical structure of a sender device 100 according to an embodiment of the present disclosure.

As shown in FIG. 2, the sender device 100 may comprise: a processor 10, a memory 11, a wireless communication circuit 12, an antenna 13, a power switch 14, a wired LAN communication processing circuit 15, an HDMI communication processing circuit 16, a USB communication processing circuit 17, a display screen 18, and an audio circuit 19.

The processor 10 can be used to read and execute computer-readable instructions. In an actual implementation, the processor 10 can mainly include a controller, an operator and a register. Here, the controller is mainly responsible for decoding instructions and sending control signals for the corresponding operations of instructions. The operator is mainly responsible for storing the register operands and intermediate operation results that are temporarily stored during the execution of instructions. In an actual implementation, the hardware architecture of the processor 10 can be an application-specific integrated circuit (ASIC) architecture, an MIPS architecture, an ARM architecture or an NP architecture.

In some embodiments, the processor 10 can be used for analyze the signals received by the wireless communication circuit 12 and/or the wired LAN communication processing circuit 15, such as a broadcast probing request, a boot instruction or a remote control code library acquisition request. The processor 10 can be used for carrying out corresponding processing operations according to the analysis result, such as generating a detection response, lighting up the display screen 18 and displaying the home page interface according to this boot instruction, or accessing the remote control code library according to the remote control code library acquisition request.

In some embodiments, the processor 10 can also be used to generate signals sent outward by the wireless communication circuit 12 and/or the wired LAN communication processing circuit 15, such as audio data, Bluetooth broadcast signals, beacon signals.

The memory 11 is coupled with the processor 10 and is used for storing various software programs and/or multiple sets of instructions. In an actual implementation, the memory 11 may include a high-speed random-access memory, and may also include a non-volatile memory, such as one or more disk storage devices, flash memory devices, or other non-volatile solid-state storage devices. The memory 11 can store operating systems, such as uCOS, VxWorks, RTLinux and other embedded operating systems. The memory 11 can also store a communication program, which can be used for communication with the sender device 100, one or more servers, or an accessory device.

The wireless communication circuit 12 may comprise one or more of a Bluetooth communication circuit 12A, an WLAN communication circuit 12B, and an infrared communication circuit 12C. The Bluetooth communication circuit 12A can include a classic Bluetooth (BT) circuit and a Bluetooth Low Energy (BLE) circuit. In some embodiments, one or more of the Bluetooth communication circuit 12A, the WLAN communication circuit 12B, the infrared communication circuit 12C can listen to the signals, such as probe requests, scanning signals, etc., transmitted by other devices (such as the receiver device 200) and can send response signals, such as probe responses, scanning responses, etc., so that other devices (such as the receiver device 200) can discover sender device 100 and establish a wireless communication connection to communicate with other devices (e.g., the receiver device 200) through one or more wireless communication technologies (Bluetooth, WLAN, or infrared technology). In other embodiments, one or more of the Bluetooth communication circuit 12A, the WLAN communication circuit 12B, the infrared communication circuit 12C may also transmit signals, such as broadcasting Bluetooth signals or beacon signals, so that other devices (such as the receiver device 200) can discover the sender device 100 and establish wireless communication connections. The sender device 100 can communicate with other devices (such as receiver device 200) through one or more wireless communication technologies (such as Bluetooth or WLAN). In some embodiments, the wireless communication circuit 12 may also include a cellular mobile communication circuit (not shown).

The wireless communication function of the sender device 100 can be realized through the antenna 13, the wireless communication circuit 12, and modulation/demodulation processor. The antenna 13 can be used for transmitting and receiving electromagnetic wave signals.

Each antenna in the sender device 100 can be used to cover single or multiple communication frequency bands. Different antennas can also be reused to improve the utilization of the antenna. For example, the antenna of the WLAN communication circuit 12B can be multiplexed into the antenna of the Bluetooth communication circuit 12A. In other embodiments, the antenna can be used in combination with a tuning switch.

The power switch 14 can be used to control the power supply to the sender device 100.

The wired LAN communication processing circuit 15 can be used to communicate with other devices in the same LAN through a wired LAN and can also be used to connect to a WAN through a wired LAN to communicate with a device in WAN.

The HDMI communication processing circuit 16 can be used to communicate with other devices through an HDMI interface (not shown).

The USB communication processing circuit 17 can be used to communicate with other devices through a USB interface (not shown).

The display 18 can be used to display images, videos, etc. The display 18 can be a liquid crystal display (LCD), an organic light-emitting diode (organic light-emitting diode, OLED) display, an active matrix organic light-emitting diode (active-matrix organic light emitting diode, AMO-LED) display, a flexible light-emitting diode (flexible light-emitting diode (FLED) displays, or a quantum dot light emitting diodes (QLED) displays.

The audio circuit 19 is used to convert digital audio information into analog audio signals for output, and is also used for convert the input analog audio information into digital audio signals. The audio circuit 19 can also be used for encoding and decoding audio signals. In some embodiments, the audio circuit 19 may be arranged in the processor 10, or a portion of the functional circuits of the audio circuit 19 may be arranged in the processor 10. The audio circuit 19 can be used to output an audio signal through an audio output interface, so that the sender device 100 can support audio playback. The audio circuit 19 can also be used to receive audio data through an audio input interface.

In some embodiments, the sender device 100 may also include serial interfaces such as RS-232 interfaces. The serial interface can be connected to other devices, such as speakers and other audio amplifiers, so that the display and audio amplifiers can play audio and video together.

The sender device 100 shown in FIG. 2 is only an example, and the structure illustrated in FIG. 2 does not constitute a specific limitation of the sender device 100. In another embodiment, the sender device 100 may have more or fewer parts than shown in FIG. 2, may combine two or more parts, or may have different part configurations. The various components shown in the diagram can be implemented in hardware, software, or a combination of hardware and software, including one or more signal processing and/or application-specific integrated circuits.

When the sender device 100 needs to output audio data to the receiver device 200, the audio circuit 19 first performs certain pre-processing on the audio data according to the preset audio data processing strategy to the pre-processed audio data, and places the pre-processed audio data in the Bluetooth protocol stack of the Bluetooth communication circuit 12A. Here, the audio data processing strategy can be one of the noise reduction or sound effect processing. For example, in a common processing method, audio data can be processed with noise reduction, pre-scale, auto volume control, surround and dynamic range control. Then, the pre-processed audio data can be encoded in the Bluetooth protocol stack of the Bluetooth communication circuit 12A and buffered in the sending queue, and finally the audio data in the sending queue is transmitted to the receiver device 200 through the Bluetooth communication circuit 12A.

Next, the data transmission method of the present disclosure is introduced. Please refer to FIG. 3. FIG. 3 is a flow chart of a data transmission method according to an embodiment of the present disclosure. As shown in FIG. 3, the data transmission method comprises:

Step 101: the sender device detects the parameter value of the audio data transmission parameter.

It can be understood that the sender device will first establish a Bluetooth protocol connection with the receiver device, if the sender device needs to transmit a piece of audio data to the receiver device through the Bluetooth protocol, when the sender device obtains the original audio data, it needs to carry out certain pre-processing of the audio data first. After obtaining the pre-processed audio data, the pre-processed audio data will be sent to the receiver device through the Bluetooth protocol.

Specifically, when the sender obtains the original audio data to be processed, it can first detect the parameter value of the audio data transmission parameter. The audio data transmission parameter here refers to the parameter involved in the process of transmitting audio data between the sender device and the receiver device through the Bluetooth protocol, which may include, but are not limited to, at least one of the following parameters: Bluetooth connection parameter, source identifier, buffer amount and retransmission sign, etc., and may also include other parameters, which are not limited by the present disclosure.

The Bluetooth connection parameter is used to indicate whether the Bluetooth connection with the receiving device is successfully established, and its parameter values are "yes" and "no".

The source identifier is used to indicate whether the source corresponding to the audio data to be processed is a multimedia source, and its parameter values are "yes" and "no".

The buffer amount indicates the amount of audio data that has been buffered by the sender device, and its parameter value is the data amount.

The retransmission sign is used to indicate whether the audio data to be processed is retransmitted, and its parameter values are "yes" and "no".

Step 102: the sender device determines whether the parameter value of the audio data transmission parameter satisfies a preset condition. If yes, then go to Step 103. If not, then the audio data to be processed is pre-processed directly according to the first audio data processing strategy currently used for processing the audio data to be processed to obtain pre-processed audio data, and then go to Step 105.

Step 103: the sender device adjusts the first audio data processing strategy currently used for processing the audio data to be processed to a second audio data processing strategy; wherein a sound effect processing effect of the first audio data processing strategy is better than a sound effect processing effect of the second audio data processing strategy, and a data processing efficiency of the second audio data processing strategy is better than a data processing efficiency of the first audio data processing strategy.

After the sender device adjusts the first audio data processing strategy to the second audio data processing strategy according to the parameter value of the audio data transmission parameter, the sound effect processing effect of the second audio data processing strategy is weaker than that of the first audio data processing strategy, and the data processing efficiency of the second audio data processing strategy is better than that of the first audio data processing strategy. In this way, the pre-processed audio data after performing a pre-processing according to the second audio data processing strategy do not have a transmission delay.

Step 104: the sender device performs pre-processing on the audio data to be processed according to the second audio data processing strategy to obtain the preprocessed audio data.

Step 105: the pre-processed audio data is transmitted to the receiver device.

It can be seen that in this embodiment, the sender device monitors the audio data transmission parameter, and when the parameter values of the audio data transmission parameters meet the preset conditions, the first audio data processing strategy with better current sound effect processing effect is adjusted to the second audio data processing strategy with slightly weaker sound effect processing effect but better data processing efficiency. Then, the sender device p reprocesses the audio data to be processed according to the second audio data processing strategy, so that the pre-processed audio data can be transmitted to the receiver device as soon as possible, so as to improve the transmission efficiency of audio data transmission and reduce the delay of audio data in the transmission process. This operation has better versatility and scalability.

Based on the embodiment shown in FIG. 3, the present disclosure also provides a data transmission method according to another embodiment. Please refer to FIG. 4. FIG. 4 is a flow chart of a data transmission method according to another embodiment of the present disclosure. The method comprises:

Step 201: the sender device starts the Bluetooth service process and the audio service process.

It can be understood that when the connection of Bluetooth protocol is established between the sender device and the receiver device, the sender device can start the Bluetooth service process. If the sender device needs to transmit a piece of audio data to the receiver device through the Bluetooth protocol, the audio service process will be started. After the original audio data is obtained by the audio service process, the audio data is pre-processed first to obtain the pre-processed audio data. Then, the pre-processed audio data are transmitted to the Bluetooth service process, and the pre-processed audio data are encoded by the Bluetooth service process and buffered in the sending queue, so that the sender device can send the audio data in the sending queue to the receiver device through the Bluetooth protocol.

Here, the Bluetooth service process refers to the running program with Bluetooth-related functions, and the audio service process refers to the running program with audio data processing function. Both of the processes are the basic units of the system for resource allocation and scheduling. In this embodiment, when the audio service process performs certain pre-processing on the audio data, the following steps need to be performed. Namely, after adjusting the first audio data processing strategy to obtain a second audio data processing strategy, the audio data is pre-processed according to the second audio data processing strategy.

Step 202: when the connection of Bluetooth protocol is established between the sender device and the receiver device, the Bluetooth service process detects that the parameter value of the Bluetooth connection parameter is used to indicate that the Bluetooth connection with the receiver device is successfully established, and the first instruction is sent to the audio service process, where the first instruction is used for instructing the audio service process to turn off the preset attenuation algorithm only for the audio data output by the Bluetooth connection. When the audio service process receives the first instruction, according to the first instruction, when pre-processing is performed on the audio data output by the Bluetooth connection, the preset attenuation algorithm contained in the first audio data processing strategy is first turned off, and then Step 203 is executed, wherein the preset attenuation algorithm is an algorithm for attenuating the audio data to be processed.

Further, the first instruction can also be used to instruct that some important enhancement algorithms, such as volume enhancement or accent enhancement algorithms, are turned off only for the audio data output by the Bluetooth connection.

It can be understood that for any original audio data are generally necessary to be outputted through multiple channels, such as the channel output through Bluetooth connection, the channel output through the speaker, the channel output through the line-out, and the output through the audio and video interface (SCART). For each channel, the pre-processing method of the audio data can be different. In this embodiment, the audio service process mainly adopts the first audio data processing strategy when pre-processing the audio data output by the Bluetooth connection. Here, only when the audio service process receives the first instruction, the preset attenuation algorithm and some important enhancement algorithms in the first audio data processing strategy are turned off.

Step 203: when the sender device obtains the original audio data, the Bluetooth service process detects the source ID of the audio data to be processed. When the parameter value of the source ID is used to indicate that the source corresponding to the audio data to be processed is a multimedia source, a second instruction is sent to the audio service process, and the second instruction is used for instructing the audio service process to turn off the preset noise reduction algorithm. When the audio service process receives the second instruction, it disables the preset noise reduction algorithm contained in the current first audio data processing strategy for processing the audio data to be processed, and the preset noise reduction algorithm is used for performing noise reduction processing on the audio data to be processed.

If the audio data to be processed is a multimedia source, because the sender device obtains the audio data of this source mainly through the network. After the audio data is obtained, the audio data will be decoded first, and a certain noise reduction process will be carried out in the decoding process. Because the sender device obtains the audio data of this source through the network, bandwidth preemption will occur between the sender device and the sending device to transmit the audio data through the Bluetooth protocol. If the sender device also needs to carry out noise reduction processing, the transmission delay of the audio data will be increased. Therefore, in this embodiment, the audio data noise reduction processing is skipped in the sender device. If the audio data to be processed is not a multimedia source, such as the audio data recorded by the sender device itself, the noise of the audio data of the source is relatively large, and bandwidth preemption is not necessary to occur due to the data transmission through the Bluetooth protocol. In this case, the noise reduction processing could be performed on the audio data of the source by the sender device.

Step 204: the Bluetooth service process detects the buffer amount. When the buffer amount is less than a certain threshold, a third instruction is sent to the audio service process, and the third instruction is used to instruct the audio service process to turn off the surround sound effect. When the audio service process receives the third instruction, it disables the surround sound algorithm contained in the first audio data processing strategy according to the third instruction.

If the data buffered by the protocol stack in the sender device is relatively small, the audio data provided by the sender device needs to avoid the overhead of the audio algorithm because the algorithm may result in excessive delay in transmitting audio data.

Step 205: when the sender device obtains the original audio data, the Bluetooth service process will detect the retransmission sign of the audio data. When the parameter value of the retransmission flag is used to indicate that the audio data to be processed is retransmission data, a fourth instruction will be sent to the audio service process, and the fourth instruction is used for instructing the audio service process to start some enhancement algorithms, such as algorithms for enhancing the volume or stressing. When the audio service process receives the fourth instruction, a preset enhancement algorithm is added to the first audio data processing strategy according to the fourth instruction to obtain a second audio data processing strategy, and the following step 206 is executed.

If the audio data to be processed is retransmission data, it means that the efficiency of transmitting the audio data through the Bluetooth protocol is poor. In addition, in the case of retransmission, the time to obtain the audio data to be processed is sufficient, and some simple sound effect processing can be performed on the audio data before the audio data is transmitted through the Bluetooth protocol, such as volume or accent enhancement, without other complex sound effect processing.

It should be noted that through Steps 202-205, the audio service process adjusts the first audio data processing strategy to the second audio data processing strategy. There is no absolute sequential relationship among Steps 203-205. These steps can be performed simultaneously or sequentially. The order of the steps shown in FIG. 4 is merely an example, not a limitation of the present disclosure.

Step 206: the audio service process performs the pre-processing on the audio data to be processed according to the second audio data processing strategy to obtain the pre-processed audio data and transfers pre-processed audio data to the Bluetooth service process.

Step 207: the Bluetooth service process encodes the pre-processed audio data, buffers the encoded audio data into the sending queue, and then the sending device sends the audio data in the sending queue to the receiver device through the Bluetooth protocol.

It can be seen that in this embodiment, when the audio data is pre-processed, in some cases, some algorithms, such as noise reduction, attenuation or accent enhancement algorithms, etc., can be turned off to reduce the audio data transmission delay. In some other cases, under the condition that time is relatively sufficient, some simple algorithms can be turned on without preempting the bandwidth. For example, in the case of retransmission, the accent enhancement can be turned on because the performance could be enhanced without affecting audio data transmission and the transmission delay.

Figure 5:
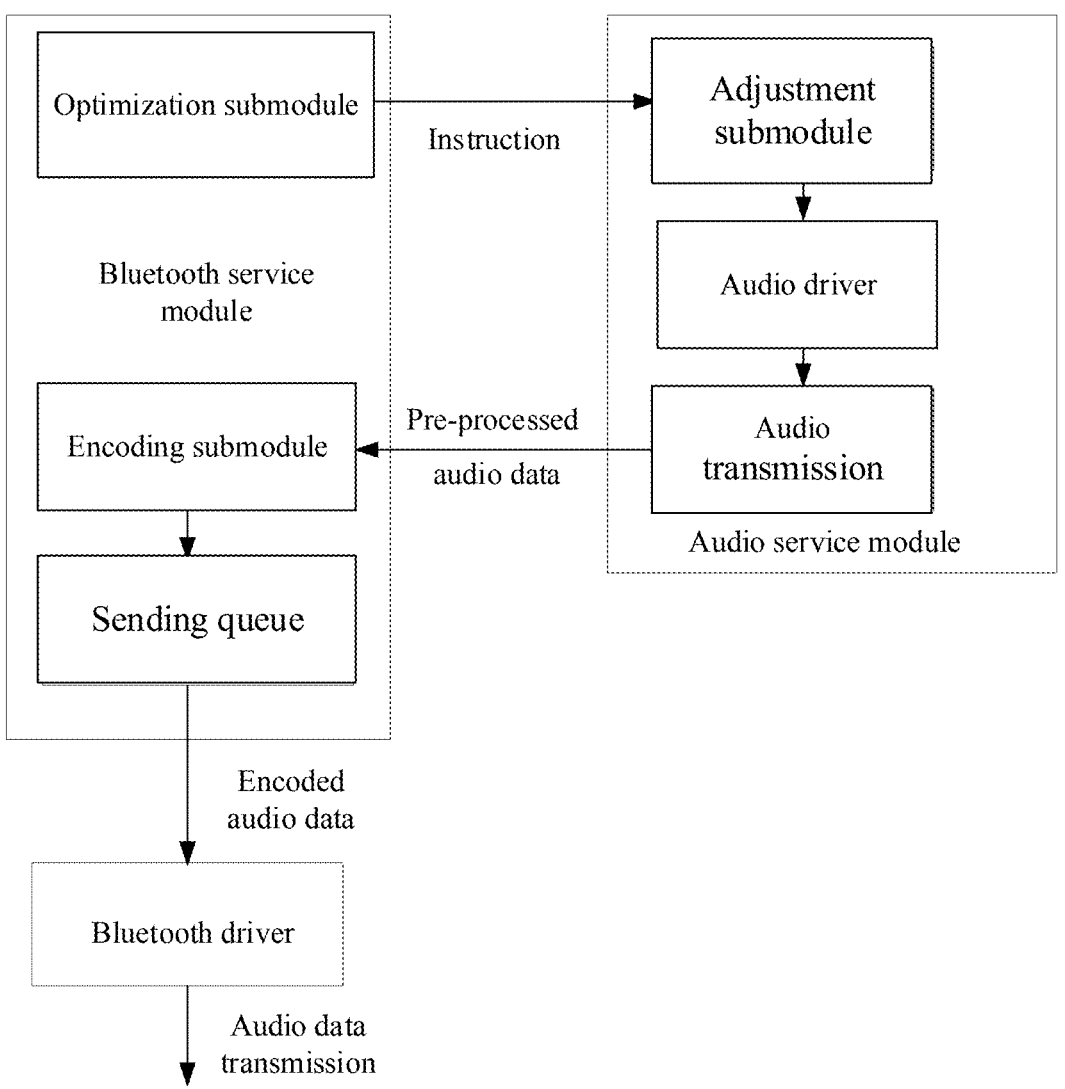
FIG. 5 is a block diagram of a data transmission device according to an embodiment of the present disclosure.

In the following disclosure, another embodiment is used to illustrate the data transmission method of the present disclosure. In this embodiment, the sender device is specifically a television set with Bluetooth communication function, and the receiver device is specifically a Bluetooth headset or a Bluetooth speaker. Please refer to FIG. 5. FIG. 5 is a block diagram of a data transmission device according to an embodiment of the present disclosure. As shown in FIG. 5, the television comprises: a Bluetooth service circuit, an audio service circuit and a Bluetooth driver.

The Bluetooth service circuit, which can be called a Bluetooth service process after it starts, is used for detecting the parameter value of the audio data transmission parameter of the audio data to be processed when a piece of audio data needs to be transmitted through the Bluetooth protocol, determining how to adjust the current first audio data processing strategy for processing the audio data to be processed according to the obtained parameter value, and then sending a corresponding instruction to the audio service circuit to instruct the audio service circuit to adjust the first audio data processing strategy to the second audio data processing strategy.

The audio service circuit can be called an audio service process it starts, and is used for executing the instruction sent by the Bluetooth service circuit, adjusting the first audio data processing strategy to the second audio data processing strategy according to the instruction, and pre-processing the audio data to be processed according to the second audio data processing strategy to obtain the pre-processed audio data, and transmitting the pre-processed audio data to the Bluetooth service circuit. Specifically, the audio service circuit can include adjustment subcircuits, audio drivers, and audio transmission (A2dp Audio) circuit. The adjustment subcircuit is used for receiving the instruction sent by the Bluetooth service circuit to adjust the first audio data processing strategy to the second audio data processing strategy according to the instruction of the Bluetooth service circuit. The audio driver is used for adopting the adjusted second audio data processing strategy and pre-processing the audio data to be processed to obtain the pre-processed audio data. The audio transmission circuit is used for transmitting the pre-processed audio data to the Bluetooth service circuit.

The Bluetooth service circuit is also used for receiving the pre-processed audio data sent by the audio service circuit, encoding the pre-processed audio data, and buffering the encoded audio data to the sending queue. Specifically, the Bluetooth service circuit may comprise an optimization subcircuit, an encoding subcircuit and a sending queue. The optimization subcircuit is used for determining how to adjust the first audio data processing strategy according to the parameter value of the detected audio data transmission parameter and sending corresponding instructions. The encoding subcircuit is used for receiving the pre-processed audio data sent by the audio service circuit, encoding the pre-processed audio data, and buffering to the sending queue.

The Bluetooth driver is used to transmit the encoded audio data buffered in the sending queue through the Bluetooth protocol to the Bluetooth speaker or Bluetooth headset.

Figure 6:
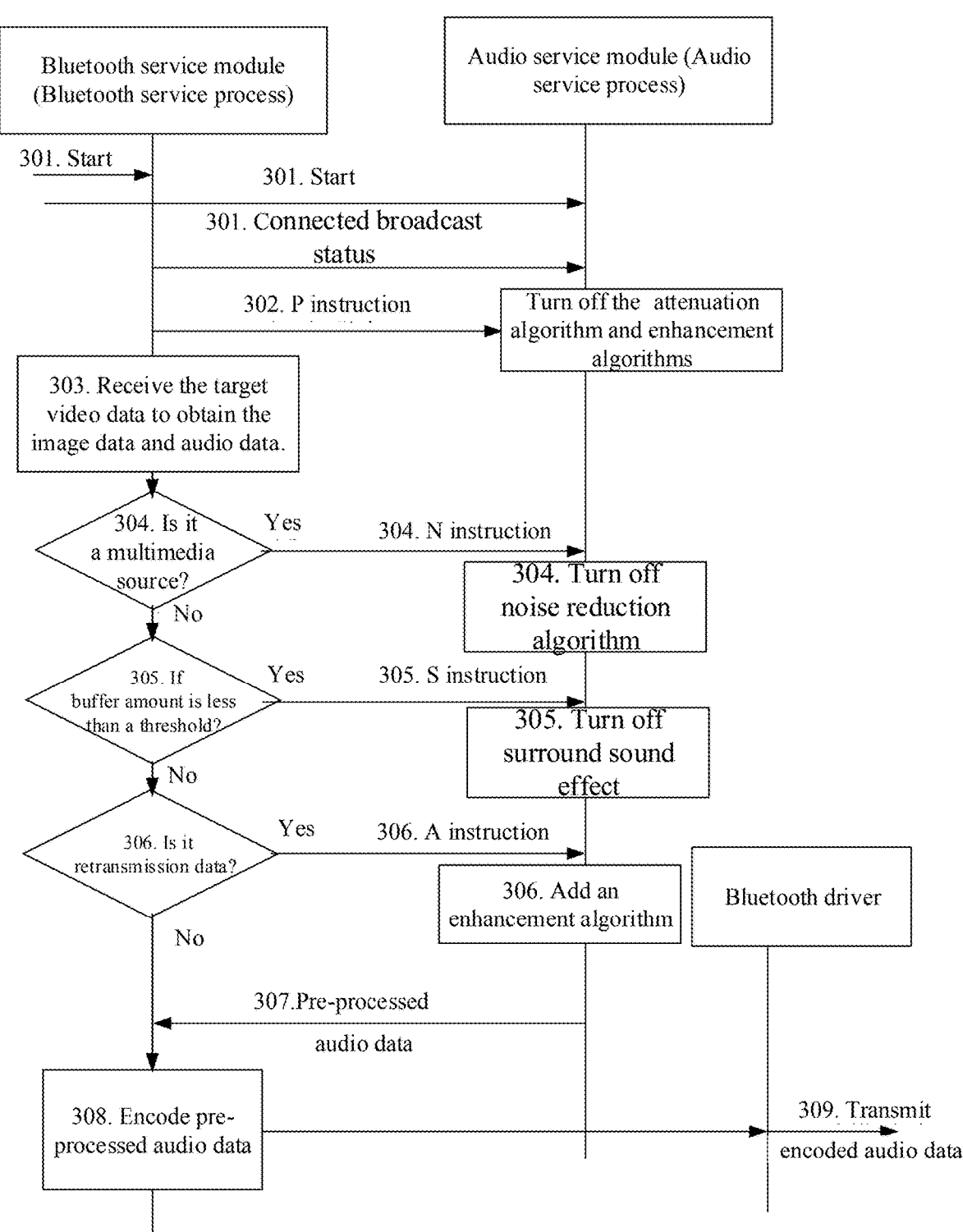
FIG. 6 is a flow chart of a data transmission method according to an embodiment of the present disclosure.

Please refer to FIG. 6. FIG. 6 is a flow chart of a data transmission method according to an embodiment of the present disclosure. As shown in FIG. 6, the television set of this embodiment can realize the audio data transmission according to the following steps, and in the following embodiment, the receiver device is a Bluetooth speaker as an example.

Step 301: After the TV is turned on, the Bluetooth service circuit and the audio service circuit are started. When the Bluetooth service circuit and the audio service circuit are started, they are the Bluetooth service process and the audio service process. When a Bluetooth communication connection is established between the TV and the Bluetooth speaker, the Bluetooth service process can call the send broadcast interface, send the connected broadcast status, and notify the audio service process, and the content of the broadcast can be: a2dp.profile.action.CONNECTION_STATE_CHANGED, STATE_CONNECTED (2).

Step 302: The Bluetooth service process detects that the parameter value of the Bluetooth connection parameter is used to indicate that the Bluetooth connection is successfully established with the Bluetooth speaker, and sends a P command (i.e., the above-mentioned first instruction), and the P instruction is used to indicate that the audio service process to turn off the preset attenuation algorithm (and some enhancement algorithms), such as volume or accent enhancement algorithms, only for the audio data output by the Bluetooth connection without the audio data output by other channels (Speaker, line-out or SCART paths), to reduce the delay of Bluetooth transmission.

Step 303: When the user requests access to a target video data through a television set, the television set receives the target video data through a network, and the television carries out processing such as decoding and demultiplexing the target video data to obtain the image data and audio data in the target video data. The audio data in it are treated as the audio data to be processed, and the following steps are performed. The image data in it will be displayed on the screen of the TV set according to a certain method, and the related illustration is omitted here.

Step 304: The Bluetooth service process detects that the parameter value of the source identifier of the audio data to be processed is used to indicate that the audio data to be processed is a multimedia source, then an N instruction (i.e., the above-mentioned second instruction) is sent, where the N instruction is used for instructing the audio service process to turn off the preset noise reduction algorithm to reduce the delay of Bluetooth transmission. If the Bluetooth service process detects that the parameter value of the source identifier of the audio data to be processed is used to indicate that the audio data to be processed is not a multimedia source, it will not send an N command and then go to step 305.

Step 305: The Bluetooth service process detects the current buffer amount, and if the buffer amount is less than a certain threshold, it sends an S instruction (i.e., the above-mentioned third instruction), where the S instruction is used to instruct the audio service process to turn off the preset surround sound effect. If the buffer amount detected by the Bluetooth service process is not less than a certain threshold, the S command will not be sent, and step 306 will be performed.

Step 306: The Bluetooth service process detects the parameter value of the retransmission sign of the audio data to be processed is used to indicate that the audio data to be processed is the retransmission data and sends an A instruction (i.e., the above-mentioned fourth instruction), where the A instruction is used for instructing the audio service process to add a preset enhancement algorithm to the first audio data processing strategy. If the Bluetooth service process detects that the parameter value of the retransmission sign of the pending audio data indicates that the pending audio data is not retransmitted, it will not send a command A and proceed to step 307.

Step 307: the audio service process adjusts the first audio data processing strategy accordingly to obtain the second audio data processing strategy according to the instruction received from the Bluetooth service process, adopts the second audio data processing strategy and pre-processes the audio data to be processed according to the second audio data processing strategy to obtain the pre-processed audio data, and sends the pre-processed audio data to the Bluetooth service process.

Step 308: The Bluetooth service process encodes the pre-processed audio data and buffers the encoded audio data to the sending queue.

Step 309: The Bluetooth driver transmits the audio data in the sending queue to the Bluetooth speaker through the Bluetooth protocol.

When the audio data is transmitted through the method according to an embodiment of the present invention, a part of the sound effect processing (such as turning off surround sound effect, or turning off some enhancement algorithms, etc.) or noise reduction processing of the audio data to be processed can be turned off first, so that the audio data transmitting delay through the Bluetooth protocol can be reduced.

In the following disclosure, another embodiment is used to illustrate the data transmission method of the present disclosure. The data transmission device in this embodiment is a distributed system 300. The distributed system may comprise a client 500 and a plurality of nodes 400 (any form of computing equipment in the access network, such as a server or a user terminal), and the client 500 and the nodes 400 are connected through the form of network communication.

Figure 7:
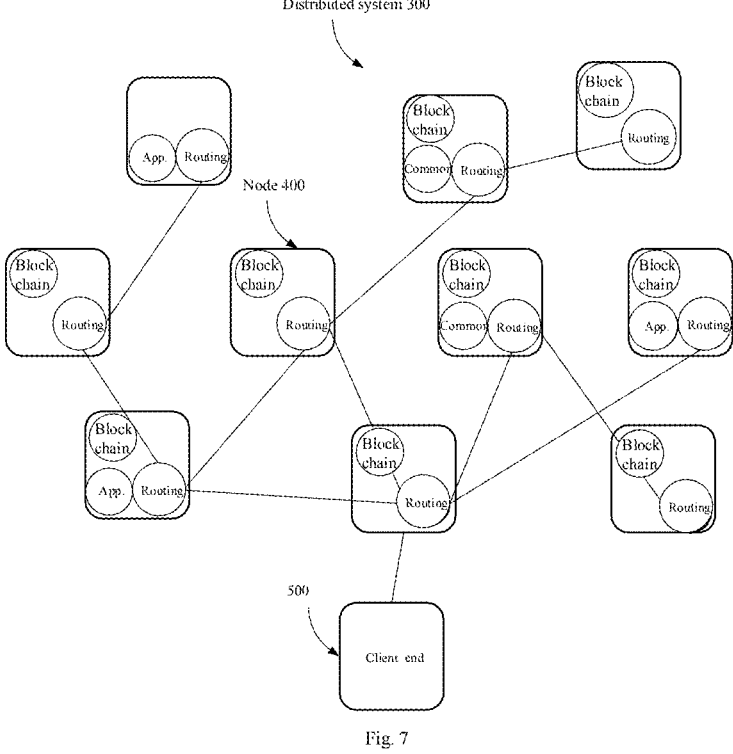
FIG. 7 is a diagram of a distributed system where a data transmission method in another embodiment of the present disclosure is applied.

In this embodiment, the distributed system is, for example, a block chain system. Please refer to FIG. 7. FIG. 7 is a diagram of a distributed system 300 utilized in a block chain system. The distributed system 300 is formed by a plurality of nodes 400 (any form of computing equipment in the access network, such as servers or user terminals) and client ends 500. The nodes from a point-to-point (P2P, Peer To Peer) network, and the P2P protocol is a system that runs in the transmission control protocol (TCP). In a distributed system, any machine such as servers and terminals can join and become a node. The node includes the hardware layer, the middle layer, the operating system layer and the application layer.

Please refer to FIG. 7. The functions of each node in the block chain system include:

1) Routing: this is the basic function of a node for supporting communication between nodes.

In addition to the routing function, the node can have the following functions:

2) Application: this is used to deploy in the block chain, realize a specific business according to the actual business needs, record the data related to the implementation function to form the recorded data, carry a digital signature in the recorded data to represent the source of the task data, send the recorded data to other nodes in the block chain system, and add the recorded data to the temporary block when the other nodes verify the source of the recorded data and the integrity of the success.

For example, the business implemented by the application includes codes that implement the data transmission function, which mainly includes:

checking the parameter value of the audio data transmission parameter. When the parameter value of the audio data transmission parameter satisfies the preset condition, the current first audio data processing strategy for processing the audio data to be processed is adjusted to a second audio data processing strategy, where the sound effect processing effect of the first audio data processing strategy is better than that of the second audio data processing strategy, and the data processing efficiency of the second audio data processing strategy is better than that of the first audio data processing strategy. The audio data to be processed is pre-processed according to the second audio data processing strategy to obtain the pre-processed audio data and then the pre-processed audio data is transmitted to the receiver device.

3) Block chain, including a series of blocks that are successively connected to each other in chronological order of generation. Once a new block is added to the block chain, it will not be removed, and the recorded data submitted by nodes in the block chain system is recorded in the block.

Figure 8:
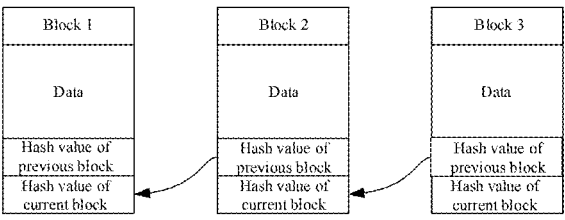
FIG. 8 is a diagram of the block structure according to another embodiment of the present disclosure.

Please refer to FIG. 8 for an optional schematic diagram of the block structure according to an embodiment of the present disclosure. Each block comprises the hash value of the block storage transaction record (the hash value of this block) and the hash value of the previous block. Each block is connected by the hash value to form a block chain. In addition, the block can also include information such as the timestamp when the block was generated. Block chain, essentially a decentralized database, is a string of blocks of data generated by cryptographic association. Each of blocks contains relevant information that is used to verify the validity of its information (anti-counterfeiting) and generate the next block.

Figure 9:
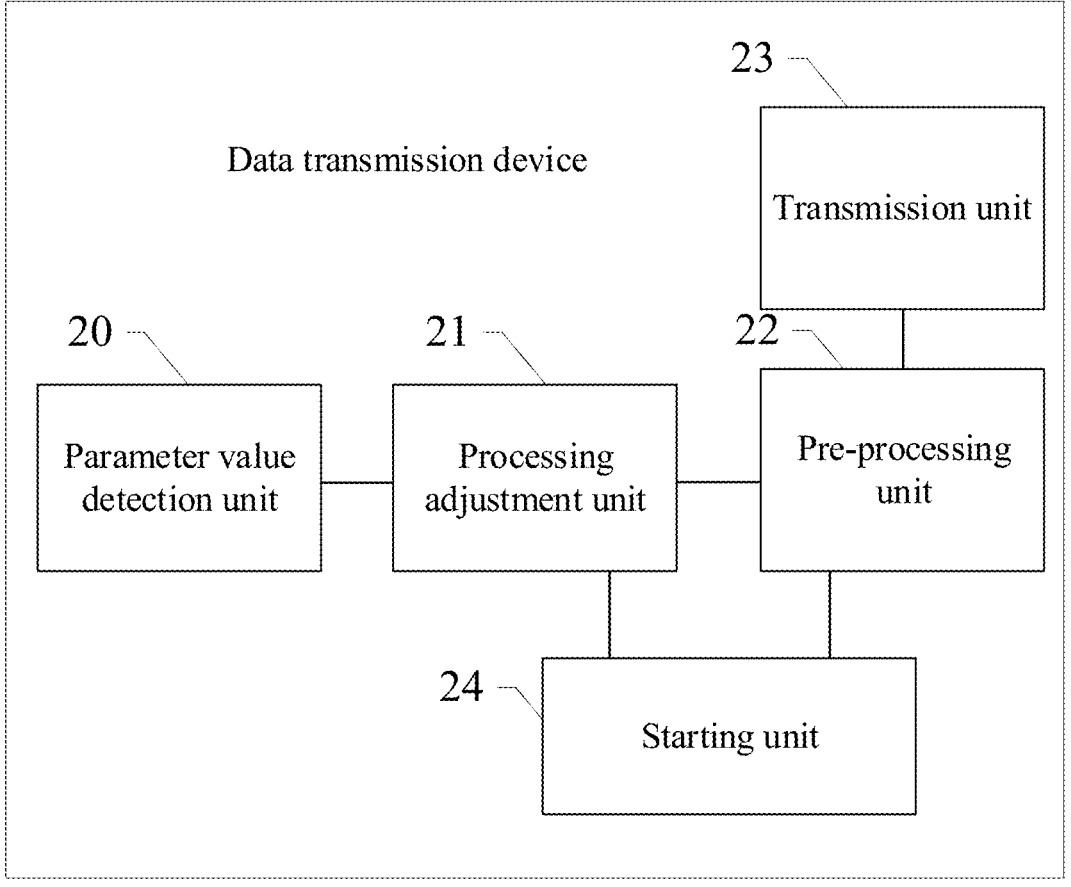
FIG. 9 is a block diagram of a data transmission device according to an embodiment of the present disclosure.

Please refer to FIG. 9. FIG. 9 is a block diagram of a data transmission device according to an embodiment of the present disclosure. The data transmission device could be used as the above-mentioned sender device that can support Bluetooth protocol transmission. The data transmission device may comprise a parameter value detection unit 20, a processing adjustment unit 21, a pre-processing unit 22 and a transmission unit 23.

The parameter value detection unit 20 is used for detecting the parameter value of the audio data transmission parameter.

Here, the audio data transmission parameter comprises at least one of: a Bluetooth connection parameter, a source identifier, a buffer amount and a retransmission sign. The Bluetooth connection parameter is used for indicating whether Bluetooth connection is successfully established with the receiver end device. The source identifier is used for indicating whether the source corresponding to the audio data to be processed is a multimedia source. The buffer amount is used for indicating the data size of the audio data that has been currently buffered. The retransmission sign is used for indicating whether the audio data to be processed is retransmission data.

The processing adjustment unit 21 is used for, when the parameter value detection unit 20 detects that the parameter value of the audio data transmission parameter satisfies the preset condition, adjusting the first audio data processing strategy currently used to process the audio data to the second audio data processing strategy. Here, the sound effect processing effect of the first audio data processing strategy is better than the second audio data processing strategy, and the data processing efficiency of the second audio data processing strategy is better than that of the first audio data processing strategy.

The preprocessing unit 22 is used for preprocessing the audio data to be processed according to the second audio data processing strategy adjusted by the processing adjustment unit 21 to obtain the preprocessed audio data.

The transmission unit 23 is used for transmitting the audio data obtained by the preprocessing unit 22 to the receiver device.

Here, the processing adjustment unit 21 in the data transmission device of this embodiment is specifically used, when the audio data transmission parameter comprises the Bluetooth connection parameter and when the parameter value of the Bluetooth connection parameter is used for indicating that the Bluetooth connection is successfully established with the receiver device, to turn off the preset attenuation algorithm included in the first audio data processing strategy obtain the second audio data processing strategy only for the audio data output of the Bluetooth connection. Here, the preset attenuation algorithm is an algorithm for attenuating the audio data to be processed.

The processing adjustment unit 21 in the data transmission device of this embodiment is also used, when the audio data transmission parameters include a source identifier and when the parameter value of the source identifier is used for indicating that the source corresponding to the audio data to be processed is a multimedia source, to turn off the preset noise reduction algorithm included in the first audio data processing strategy. The preset noise reduction algorithm is an algorithm for performing a noise reduction processing on the audio data to be processed.

The processing adjustment unit 21 is also used to turn off the surround sound effect algorithm included in the first audio data processing strategy when the audio data transmission parameter comprises a buffer amount and when the buffer amount is less than a certain threshold.

The processing adjustment unit 21 is also used, when the audio data transmission parameter comprise a retransmission sign and when the parameter value of the retransmission flag is used to indicate that the audio data to be processed is retransmission data, to add a preset enhancement algorithm to the first audio data processing strategy.

Furthermore, the data transmission device may further comprise a starting unit 24.

The starting unit 24 is used to start the Bluetooth service process and the audio service process. When the processing adjustment unit 21 determines that the parameter value of the audio data transmission parameter satisfies the preset condition through the Bluetooth service process, started by the starting unit 24, an instruction is sent to the audio service process such that the audio service process adjusts the first audio data processing strategy to the second audio data processing strategy according to the instruction, and the preprocessing unit 22 preprocesses the audio data to be processed through the audio service process, started by the starting unit 24, to obtain the preprocessed audio data.

The data transmission device of this embodiment monitors the audio data transmission parameter. When the parameter value of the audio data transmission parameter meets the preset conditions, the processing adjustment unit 21 adjusts the first audio data processing strategy with better current sound effect processing effect to the second audio data processing strategy with a weaker sound effect processing effect but a better data processing efficiency. The preprocessing unit 22 carries out preprocessing on the audio data to be processed according to the second audio data processing strategy, and the preprocessed audio data can be obtained as soon as possible and transmitted to the receiver device, thereby improving the transmission efficiency and reducing the transmission delay of audio data in the transmission process. This is versatile and scalable.

Figure 10:
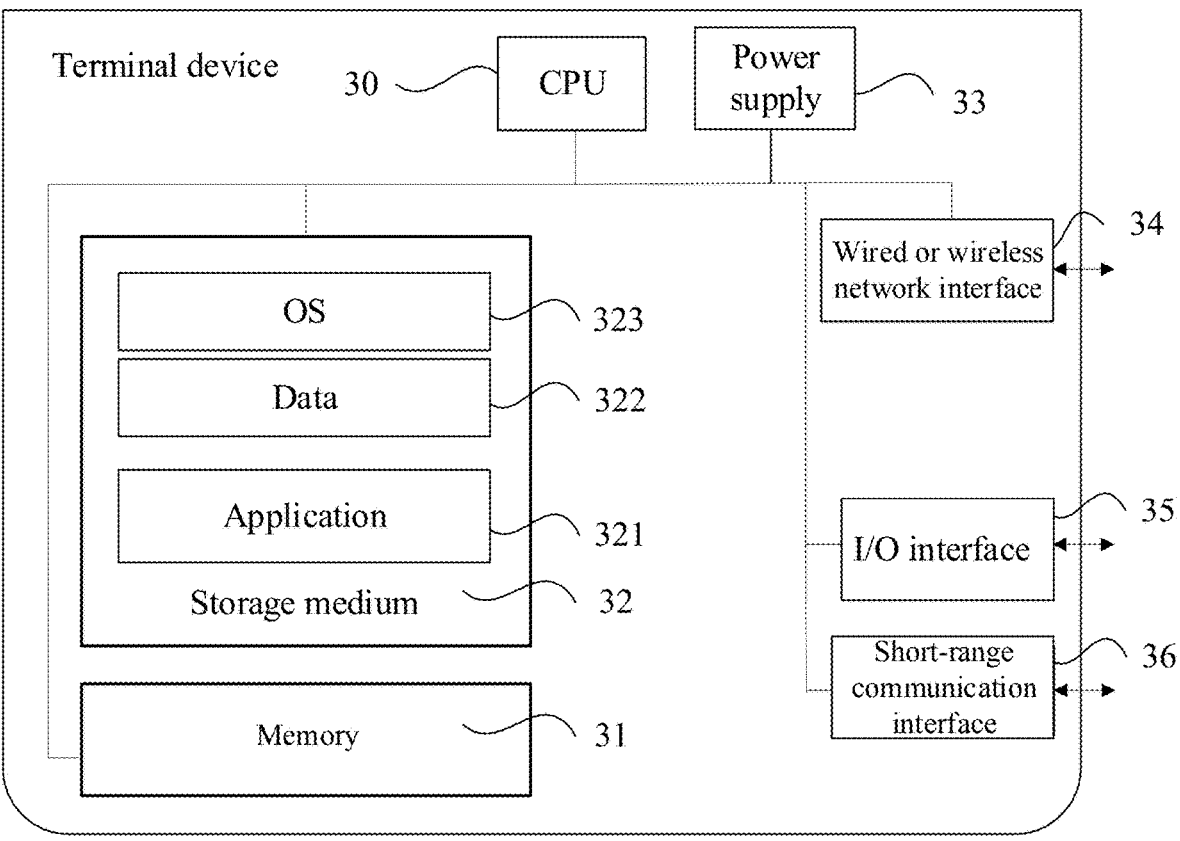
FIG. 10 is a block diagram of a terminal device according to an embodiment of the present disclosure.

Please refer to FIG. 10. FIG. 10 is a block diagram of a terminal device according to an embodiment of the present disclosure. The terminal device can have large differences due to different configurations or performances, and may include one or more central processing units (CPU) 30 (such as one or more processors) and a memory 31, and one or more storage media 32 for storing applications 321 or data 322 (for example, one or one storage device with an additional amount of storage). Here, the memory 31 and the storage medium 32 may be temporary storage or permanent storage. The program stored in the storage medium 32 may comprise one or more circuits (not shown), and each circuit may include a series of instructional operations on the terminal device. Furthermore, the central processing unit 30 can be arranged to communicate with the storage medium 32 to execute a series of instruction operations in the storage medium 32 on the terminal device.

Specifically, the application 321 stored in the storage medium 32 comprises an application for data transmission, and the program may include a parameter value detection unit 20, a processing adjustment unit 21, a preprocessing unit 22, a transmission unit 23 and a starting unit 24 in the data transmission apparatus, and the related illustration is omitted herein. Furthermore, the central processing unit 30 can be programmed to communicate with the storage medium 32 to perform a series of operations corresponding to the application for data transmission stored in the storage medium 32 on the terminal device.

The terminal device may also comprise one or more power supplies 33, one or more wired or wireless network interfaces 34, one or more input and output interfaces 35, short-range communication interfaces (such as Bluetooth communication interfaces) 36, and/or one or more operating systems 323, such as Windows Server™, Mac OS X™, Unix™, Linux™, FreeBSD™ and so on. In this embodiment, when the audio data is transmitted, audio data can be transmitted between other Bluetooth devices through a short-range communication interface 36.

The steps performed by the data transmission device in the above-mentioned method according to an embodiment may be based on the structure of the terminal device shown in the FIG. 10.

In addition, according to an embodiment of the present disclosure, a computer-readable storage medium is disclosed. The computer-readable storage medium stores a plurality of computer programs, which can be loaded and executed by a processor to perform the above-mentioned data transmission method.

On the other hand, embodiments of the present invention also provide a terminal device, comprising a processor and a memory.

The memory is used for storing a plurality of computer programs, the computer program is used for loading by the processor and executing the data transmission method performed by the data transmission apparatus; the processor is used for realizing each computer program in the plurality of computer programs.

A person skilled in the art may understand that all or part of the steps in the various methods of the above embodiments can be completed by instructing the relevant hardware through a program, and the program may be stored in a computer-readable storage medium, and the storage medium may include: read-only memory (ROM), random access memory (RAM), disks or optical discs, etc.

The above is a data transmission method provided in the embodiment of the present invention, The equipment and storage medium and terminal equipment are described in detail, and the principle and embodiment of the present invention are elaborated by applying specific examples in this article, and the description of the above embodiments is only used to help understand the method of the present invention and its core idea.

17

What is claimed is:

1. A data transmission method, the method comprising:

detecting a parameter value of an audio data transmission parameter;

when the parameter value of the audio data transmission parameter satisfies a preset condition, adjusting a first audio data processing strategy currently used for processing the audio data to be processed to a second audio data processing strategy, wherein a sound effect processing effect of the first audio data processing strategy is better than a sound effect processing effect of the second audio data processing strategy, and a data processing efficiency of the second audio data processing strategy is better than a data processing efficiency of the first audio data processing strategy;

performing a pre-process on the audio data to be processed according to the second audio data processing strategy to obtain a pre-processed audio data; and transferring the pre-processed audio data to the receiver device;

the method further comprising a following step before the step of adjusting the first audio data processing strategy currently used for processing the audio data to be processed to the second audio data processing strategy:

starting a Bluetooth service process and an audio service process;

wherein when the parameter value of the audio data transmission parameter meets a preset condition, the step of adjusting the first audio data processing strategy currently used for processing the audio data to be processed to the second audio data processing strategy comprises:

when the Bluetooth service process determines that the parameter value of the audio data transmission parameter satisfies a preset condition, sending an instruction to the audio service process such that the audio service process adjusts the first audio data processing strategy to the second audio data processing strategy according to the instruction.

2. The method of claim 1, wherein the audio data transmission parameter comprises one of Bluetooth connection parameter, a source identifier, a buffer amount and a retransmission sign;

wherein the Bluetooth connection parameter is configured to indicate whether a Bluetooth connection is successfully established with the receiver device; the source identifier is configured to indicate whether a source corresponding to the audio data to be processed is a multimedia source; the buffer amount is configured to indicate a data size of the audio data that has been currently buffered; and the retransmission flag is configured to indicate whether the audio data to be processed is retransmission data.

3. The method of claim 2, wherein when the audio data transmission parameter comprises the Bluetooth connection parameter and when the parameter value of the audio data transmission parameter satisfies a preset condition, the step of adjusting the first audio data processing strategy currently used for processing the audio data to be processed to the second audio data processing strategy comprises:

when the parameter value of the Bluetooth connection parameter is configured to indicate that the Bluetooth connection is successfully established with the receiver device, turning off a preset attenuation algorithm included in the first audio data processing strategy only for the audio data output by the Bluetooth connection to obtain the second audio data processing strategy, wherein the preset attenuation algorithm is an algorithm for attenuating the audio data to be processed.

4. The method of claim 2, wherein when the audio data transmission parameter comprises a source identifier and when the parameter value of the audio data transmission parameter satisfies a preset condition, the step of adjusting the first audio data processing strategy currently used for processing the audio data to be processed to the second audio data processing strategy comprises:

when the parameter value of the source identifier is configured to indicate that the source corresponding to the audio data to be processed is a multimedia source, turning off a preset noise reduction algorithm included in the first audio data processing strategy, and the preset noise reduction algorithm is an algorithm for performing a noise reduction on the audio data to be processed.

5. The method of claim 2, wherein when the audio data transmission parameter comprises the buffer amount and when the parameter value of the audio data transmission parameter satisfies a preset condition, the step of adjusting the first audio data processing strategy currently used for processing the audio data to be processed to the second audio data processing strategy comprises:

when the buffer amount is less than a certain threshold, turning off a surround sound algorithm included in the first audio data processing strategy.

6. The method of claim 2, wherein when the audio data transmission parameter comprises a retransmission sign and when the parameter value of the audio data transmission parameter satisfies a preset condition, the step of adjusting the first audio data processing strategy currently used for processing the audio data to be processed to the second audio data processing strategy comprises:

when the parameter value of the retransmission sign is configured to indicate that the audio data to be processed is a retransmission data, adding a preset enhancement algorithm to the first audio data processing strategy.

7. A data transmission device, comprising:

a parameter value detection unit, configured to detect a parameter value of an audio data transmission parameter;

a processing adjustment unit, configured to adjusting a first audio data processing strategy currently used for processing the audio data to be processed to a second audio data processing strategy when the parameter value of the audio data transmission parameter satisfies a preset condition, wherein a sound effect processing effect of the first audio data processing strategy is better than a sound effect processing effect of the second audio data processing strategy, and a data processing efficiency of the second audio data processing strategy is better than a data processing efficiency of the first audio data processing strategy;

a pre-processing unit, configured to perform a pre-process on the audio data to be processed according to the second audio data processing strategy to obtain a pre-processed audio data; and a transmission unit, configured to transfer the pre-processed audio data to the receiver device;

the method further comprising a following step before the step of adjusting the first audio data processing strategy currently used for processing the audio data to be processed to the second audio data processing strategy:

starting a Bluetooth service process and an audio service process;

wherein when the parameter value of the audio data transmission parameter meets a preset condition, the step of adjusting the first audio data processing strategy currently used for processing the audio data to be processed to the second audio data processing strategy comprises:

when the Bluetooth service process determines that the parameter value of the audio data transmission parameter satisfies a preset condition, sending an instruction to the audio service process such that the audio service process adjusts the first audio data processing strategy to the second audio data processing strategy according to the instruction.

8. The data transmission device of claim 7, wherein the audio data transmission parameter comprises one of Bluetooth connection parameter, a source identifier, a buffer amount and a retransmission sign;

wherein the Bluetooth connection parameter is configured to indicate whether a Bluetooth connection is successfully established with the receiver device; the source identifier is configured to indicate whether a source corresponding to the audio data to be processed is a multimedia source; the buffer amount is configured to indicate a data size of the audio data that has been currently buffered; and the retransmission flag is configured to indicate whether the audio data to be processed is retransmission data.

9. The data transmission device of claim 8, wherein the processing adjustment unit is further configured to, when the audio data transmission parameter comprises the Bluetooth connection parameter and when the parameter value of the Bluetooth connection parameter is configured to indicate that the Bluetooth connection is successfully established with the receiver device, turn off a preset attenuation algorithm included in the first audio data processing strategy only for the audio data output by the Bluetooth connection to obtain the second audio data processing strategy, wherein the preset attenuation algorithm is an algorithm for attenuating the audio data to be processed.

10. The data transmission device of claim 8, wherein the processing adjustment unit is further configured to, when the audio data transmission parameters comprise a source identifier and when the parameter value of the source identifier is configured to indicate that the source corresponding to the audio data to be processed is a multimedia source, turn off a preset noise reduction algorithm included in the first audio data processing strategy, and the preset noise reduction algorithm is an algorithm for performing a noise reduction on the audio data to be processed.

11. The data transmission device of claim 8, wherein the processing adjustment unit is further configured to, when the audio data transmission parameter comprises the buffer amount and when the buffer amount is less than a certain threshold, turning off a surround sound algorithm included in the first audio data processing strategy.

12. The data transmission device of claim 8, wherein the processing adjustment unit is further configured to, when the audio data transmission parameter comprises a retransmission sign and when the parameter value of the retransmission sign is configured to indicate that the audio data to be processed is a retransmission data, add a preset enhancement algorithm to the first audio data processing strategy.

13. The data transmission device of claim 7, further comprising:

a starting unit, configured to start a Bluetooth service process and an audio service process;

wherein the processing adjusting unit is configured to, when the Bluetooth service process determines that the parameter value of the audio data transmission parameter satisfies a preset condition, send an instruction to the audio service process such that the audio service process adjusts the first audio data processing strategy to the second audio data processing strategy according to the instruction;

wherein after the pre-processing unit pre-processes the audio data to be processed through the audio service process initiated by the startup unit, the pre-processed audio data is obtained.

14. A terminal device, comprising a processor and a memory;

wherein the memory is used for storing a plurality of computer programs, executed by the processor to perform a data transmission method comprising:

detecting a parameter value of an audio data transmission parameter;

when the parameter value of the audio data transmission parameter satisfies a preset condition, adjusting a first audio data processing strategy currently used for processing the audio data to be processed to a second audio data processing strategy, wherein a sound effect processing effect of the first audio data processing strategy is better than a sound effect processing effect of the second audio data processing strategy, and a data processing efficiency of the second audio data processing strategy is better than a data processing efficiency of the first audio data processing strategy;

performing a pre-process on the audio data to be processed according to the second audio data processing strategy to obtain a pre-processed audio data; and transferring the pre-processed audio data to the receiver device;

the method further comprising a following step before the step of adjusting the first audio data processing strategy currently used for processing the audio data to be processed to the second audio data processing strategy:

starting a Bluetooth service process and an audio service process;

wherein when the parameter value of the audio data transmission parameter meets a preset condition, the step of adjusting the first audio data processing strategy currently used for processing the audio data to be processed to the second audio data processing strategy comprises:

when the Bluetooth service process determines that the parameter value of the audio data transmission parameter satisfies a preset condition, sending an instruction to the audio service process such that the audio service process adjusts the first audio data processing strategy to the second audio data processing strategy according to the instruction.

15. The terminal device of claim 14, wherein the audio data transmission parameter comprises one of Bluetooth connection parameter, a source identifier, a buffer amount and a retransmission sign;

wherein the Bluetooth connection parameter is configured to indicate whether a Bluetooth connection is successfully established with the receiver device; the source identifier is configured to indicate whether a source corresponding to the audio data to be processed is a multimedia source; the buffer amount is configured to indicate a data size of the audio data that has been currently buffered; and the retransmission flag is configured to indicate whether the audio data to be processed is retransmission data.

16. The terminal device of claim 15, wherein when the audio data transmission parameter comprises the Bluetooth connection parameter and when the parameter value of the audio data transmission parameter satisfies a preset condition, the operation of adjusting the first audio data processing strategy currently used for processing the audio data to be processed to the second audio data processing strategy comprises:

when the parameter value of the Bluetooth connection parameter is configured to indicate that the Bluetooth connection is successfully established with the receiver device, turning off a preset attenuation algorithm included in the first audio data processing strategy only for the audio data output by the Bluetooth connection to obtain the second audio data processing strategy, wherein the preset attenuation algorithm is an algorithm for attenuating the audio data to be processed.

17. The terminal device of claim 15, wherein when the audio data transmission parameter comprises a source identifier and when the parameter value of the audio data transmission parameter satisfies a preset condition, the operation of adjusting the first audio data processing strategy currently used for processing the audio data to be processed to the second audio data processing strategy comprises:

when the parameter value of the source identifier is configured to indicate that the source corresponding to the audio data to be processed is a multimedia source, turning off a preset noise reduction algorithm included in the first audio data processing strategy, and the preset noise reduction algorithm is an algorithm for performing a noise reduction on the audio data to be processed.

18. The terminal device of claim 15, wherein when the audio data transmission parameter comprises the buffer amount and when the parameter value of the audio data transmission parameter satisfies a preset condition, the operation of adjusting the first audio data processing strategy currently used for processing the audio data to be processed to the second audio data processing strategy comprises:

when the buffer amount is less than a certain threshold, turning off a surround sound algorithm included in the first audio data processing strategy.

19. The terminal device of claim 15, wherein when the audio data transmission parameter comprises a retransmission sign and when the parameter value of the audio data transmission parameter satisfies a preset condition, the operation of adjusting the first audio data processing strategy currently used for processing the audio data to be processed to the second audio data processing strategy comprises:

when the parameter value of the retransmission sign is configured to indicate that the audio data to be processed is a retransmission data, adding a preset enhancement algorithm to the first audio data processing strategy.

* * * * *